United States Patent [19]
McKiel, Jr.

[11] 4,455,678
[45] Jun. 19, 1984

[54] TEST METHOD AND DEVICE FOR FM TRANSMITTER

[75] Inventor: Frank A. McKiel, Jr., Dallas, Tex.

[73] Assignee: Rockwell International Corporation, El Segundo, Calif.

[21] Appl. No.: 289,588

[22] Filed: Aug. 3, 1981

[51] Int. Cl.³ .............................................. H04B 17/00
[52] U.S. Cl. ................................. 455/115; 324/77 A; 332/20
[58] Field of Search ..................... 455/43, 44, 67, 110, 455/115; 324/77 A; 332/18-20

[56] References Cited
U.S. PATENT DOCUMENTS

| | | | |
|---|---|---|---|
| 2,293,022 | 8/1942 | Crosby | 455/115 |
| 3,071,726 | 1/1963 | Nelson | 455/115 |
| 3,914,693 | 10/1975 | Ohlen | 455/115 |

*Primary Examiner*—Jin F. Ng
*Attorney, Agent, or Firm*—Michael E. Taken; V. Lawrence Sewell; H. Fredrick Hamann

[57] ABSTRACT

A direct measurement technique is disclosed for determining baseband frequency response of an FM transmitter without using response-altering test devices otherwise injecting frequency dependent characteristics, such as pre-emphasis networks and demodulators. The technique enables absolute, universal standardization. Variations in a sideband amplitude in the output spectrum from the FM transmitter unit under test are monitored while changing the frequency and controlling the amplitude of the modulating signal so as to maintain a constant modulation index B. A signal generator supplies the modulating signal directly to the FM transmitter without frequency dependent pre-emphasis. A spectrum analyzer directly examines the output spectrum of the FM transmitter without demodulation.

5 Claims, 6 Drawing Figures

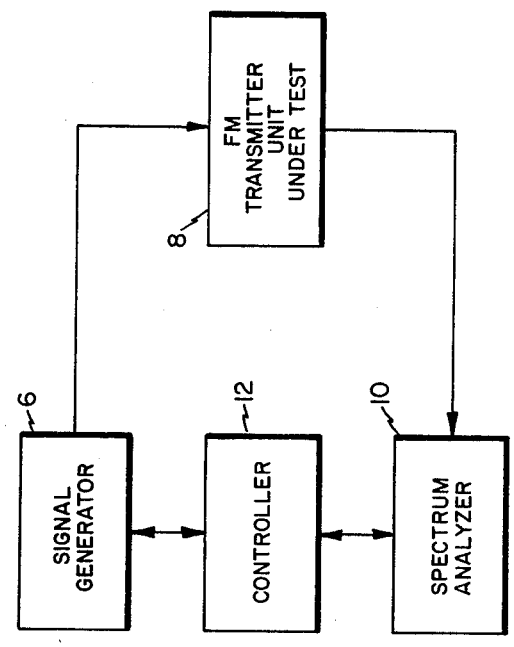
FIG. 3
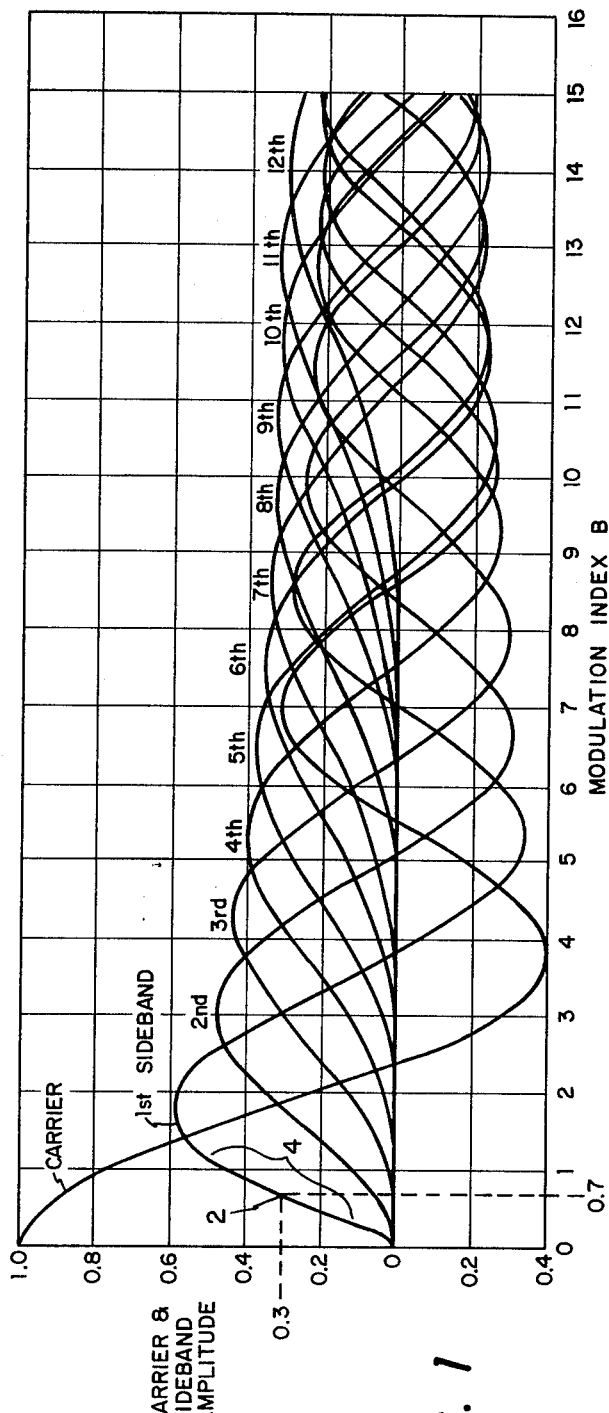
FIG. 1
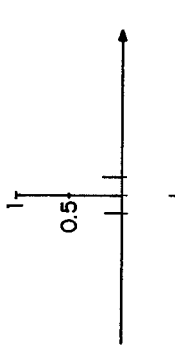
FIG. 2A
FIG. 2B
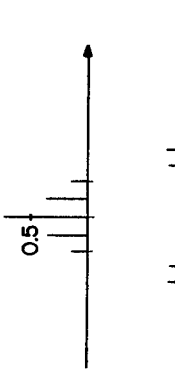
FIG. 2C
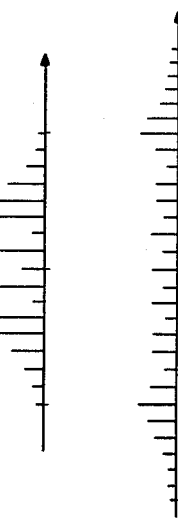
FIG. 2D

TEST METHOD AND DEVICE FOR FM TRANSMITTER

TECHNICAL FIELD

The invention relates to a technique and apparatus for determining baseband frequency response of an FM transmitter, and more particularly to a highly accurate, universal standard which avoids comparison with any other response-altering device.

BACKGROUND

Various methods for determining baseband frequency response of an FM transmitter are known. One technique relies upon the FM transmitter response alignment as performed in conjunction with a deviation meter or FM demodulator. These latter devices lend a frequency dependent response characteristic which cannot be quantified independently of the FM transmitter. Another previous technique employs a pre-emphasis network at the input to the FM transmitter having a 6 dB per octave amplitude vs. frequency characteristic curve for altering the modulating signal input to the FM transmitter to compensate a 6 dB per octave decrease in the first sideband output of the FM transmitter as input frequency is increased.

While these prior approaches have proven useful for their intended purposes, they are subject to various objections. Both the FM demodulator and the pre-emphasis methods introduce a frequency dependent response characteristic relative to the particular application. This injected, relative response characteristic is not amenable to an absolute, universal standard. For example, using the pre-emphasis method, FM transmitters at distant locations could be checked against the same quantized standard only by checking the first transmitter with a given pre-emphasis network to the second station for testing of its FM transmitter, or by building exactly the same network for testing at the second station. The first alternative is not practicable, and the second alternative is subject to a certain unavoidable margin of inaccuracy due to manufacturing tolerances, etc. Furthermore, in either alternative, the network is volatile and will drift in its response characteristics.

The response of an FM transmitter may be compensated by tuning the response of the corresponding FM receiver or demodulator at the receive end of a transmission system. From a manufacturing and engineering standpoint, there is a need to alleviate this burdensome compensation and instead provide uniformity and interchangability among FM transmitters at the same or different locations, or at different times of manufacture. There is a further need for industry wide compatability of modulated transmission systems. Interchangability is particularly important in standby switching type systems and for customer support in exact replacement parts.

SUMMARY

The present invention provides a simple, efficient and highly accurate method and apparatus for determining baseband frequency response of an FM transmitter. The invention eliminates comparison with any other response-altering device. The invention enables the exclusion of response-tunable test devices such as an FM demodulator or a pre-emphasis network, and the frequency dependent response characteristics injected thereby.

The present invention achieves an absolute, universal standardization technique for evaluating modulator response which has previously been unobtainable. There is no relative response characteristic dependent upon the particular application at hand. The modulating signal is directly input to the FM transmitter without pre-emphasis, and the output of the FM transmitter is directly read without demodulation.

BRIEF DESCRIPTION OF THE DRAWINGS

FIG. 1 is a plot of Bessel functions showing carrier and sideband amplitude vs. modulation index B, as is well known in the art.

FIG. 2 shows various arbitrarily chosen amplitude-frequency FM signal spectrums, as is well known in the art. FIG. 2a shows the spectrum for modulation index B=0.2. In FIG. 2b, B=1; in FIG. 2c, B=5; and in FIG. 2d, B=10.

FIG. 3 is a circuit block diagram of measurement test apparatus constructed in accordance with the invention.

DETAILED DESCRIPTION

FIG. 1 shows the carrier and sideband amplitude output by an FM transmitter plotted against modulation index B. For example, at a modulation index B=0.2, the carrier is very strong and the first sideband is just beginning to appear, FIG. 2a. This first sideband is spaced from the carrier by an amount equal to the modulating frequency, as is well known. For a modulation index B=1, the carrier is decreased slightly and more energy now appears in the sidebands, with the first sideband having a higher amplitude and the second sideband having a noticeable amplitude, FIG. 2b. For a modulation index B=5, the energy is even further distributed among the various sidebands, which sidebands appear at integral multiples of the modulating frequency on both sides of the carrier, FIG. 2c. Reading FIG. 1 for a modulation index B=5, eight sidebands are noticeable, as shown in FIG. 2c. FIG. 2d shows the output spectrum for modulation index B=10.

Modulation index B is defined as the ratio of the carrier frequency deviation $\Delta f_c$ to the modulating frequency $f_m$, Equation 1. The carrier frequency deviation $\Delta f_c$ is proportional to the amplitude A of the input modulating signal, as is well known.

$$B = \frac{\Delta f_c}{f_m} \propto \frac{A}{f_m} \quad (1)$$

Modulation index B may thus be increased by increasing amplitude A and/or decreasing frequency $f_m$.

The present inventive technique obtains modulator frequency response of the FM transmitter unit under test by monitoring variations in a designated sideband amplitude in the output spectrum while changing the frequency of the modulating signal and controlling the amplitude of the modulating signal so as to maintain a constant modulation index B. The inventive technique departs from the need to demodulate the output of the FM transmitter in measuring frequency response, and also departs from the use of a pre-emphasis network in the input to the FM transmitter. Instead, the modulating signal is input directly to the FM transmitter without pre-emphasis, and the output of the FM transmitter is directly examined without demodulation.

In the preferred embodiment, the first sideband amplitude in the output spectrum of the FM transmitter unit under test is monitored at a low value of modulation index B where the Bessel function is essentially linear for the first sideband amplitude. For example, FIG. 1, a modulation index B=0.7 corresponds to the point designated 2 on the plotted curve for the first sideband amplitude which in turn corresponds to an amplitude of 0.3, as shown by dashed line. The modulating signal frequency input to the FM transmitter unit under test is increased through a given baseband spectrum, and its amplitude is correspondingly decreased so that modulation index B remains constant, i.e., at 0.7. The first sideband amplitude output of the FM transmitter unit under test is monitored and if the amplitude level remains a 0.3 then the FM transmitter unit has an accurate response.

A low modulation index is preferred in order to keep the Bessel function in a substantially linear region, for example region 4, FIG. 1, such that variations in response to the modulating signal affect first sideband amplitude in direct proportion, i.e., dB for dB. Modulation index $B \leq$ about 1 satisfies this condition. The use of a low modulation index B also avoids having to overdrive the modulator at high baseband frequencies.

FIG. 3 shows in combination apparatus for implementing the direct measurement technique, free of frequency-response-altering devices. A signal generator 6 sends a modulating signal of selectible frequency, and of independently selectibe amplitude, to the FM transmitter unit 8 under test. The frequency of the modulating signal is varied through a given baseband frequency range, and the amplitude is controlled so as to maintain a constant modulation index B. This modulating signal from generator 6 is supplied directly to the FM transmitter unit 8 without frequency dependent pre-emphasis. Sideband amplitude measurement is performed by a spectrum analyzer 10 directly receiving the output of FM transmitter 8 without demodulation. For an accurate-response (flat) FM transmitter, the sideband amplitude measured by the spectrum analyzer remains substantially the same for all baseband frequencies in the given range.

A controller 12 may be provided for sequencing signal generator 6 through the designated baseband frequency range and for indicating the correspondent amplitude level for constant B. Controller 12 may also coordinatingly indicate to spectrum analyzer 10 the frequency currently being output by signal generator 6 such that the spectrum analyzer can immediately set to the correspondent sideband frequency to check sideband amplitude.

Examples of commercially available devices suitable for use as the components in the apparatus combination for carrying out the present test method are Hewlett-Packard 3336, 8566 and 9825 for signal generator 6, spectrum analyzer 10 and controller 12, respectively.

It is recognized that various modifications are possible within the scope of the appended claims.

I claim:

1. A technique for determining baseband frequency response of an FM transmitter, comprising applying to the transmitter a modulating signal which results in a frequency spectrum for the output of the transmitter having carrier and sideband amplitudes; further, measuring variations in one of said amplitudes in said output of the transmitter, while setting the frequency of the modulating signal at values selected to provide a frequency response, and controlling the amplitude of said modulating signal at each of said selected frequency values so as to maintain a constant modulation index B.

2. The invention according to claim 1 wherein said variations measured are in the amplitude of the first sideband, at a value of $B \leq$ about 1 such that variations of the modulation index affect said first sideband amplitude approximately in direct proportion.

3. The invention according to claim 1 wherein said applying of a modulating signal is performed by supplying said modulating signal directly to the FM transmitter without frequency dependent pre-emphasis, and wherein said measuring of variations is performed by spectrum analyzing the output of the FM transmitter without demodulation.

4. Apparatus for determining baseband frequency response of an FM transmitter, comprising:
    a signal generator supplying a modulating signal directly to the FM transmitter without frequency dependent pre-emphasis, means for setting the modulating signal frequency at values selected to provide a frequency response in a given baseband frequency range and controlling the modulating signal amplitude at each of said selected values so as to maintain a constant modulation index B; and
    a spectrum analyzer directly receiving the output of the FM transmitter without demodulation, for measuring the amplitude variations of a given sideband in the output of the FM transmitter.

5. The invention according to claim 4 wherein said setting means comprises a coordinating controller interfacing the signal generator and the spectrum analyzer for sequencing the signal generator through said given baseband frequency range and correspondent amplitude value and for indicating to the spectrum analyzer which frequency is currently being output from the signal generator.

* * * * *